(12) United States Patent
Aota et al.

(10) Patent No.: US 7,623,211 B2
(45) Date of Patent: Nov. 24, 2009

(54) LIQUID CRYSTAL DISPLAY

(75) Inventors: Masaaki Aota, Ogaki (JP); Yasuo Segawa, Kitagata-cho (JP); Tomohide Onogi, Anpachi-cho (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 0 days.

(21) Appl. No.: 12/098,811

(22) Filed: Apr. 7, 2008

(65) Prior Publication Data
US 2008/0259257 A1 Oct. 23, 2008

(30) Foreign Application Priority Data
Apr. 17, 2007 (JP) ............................. 2007-107870
Jan. 31, 2008 (JP) ............................. 2008-020326

(51) Int. Cl.
*G02F 1/1343* (2006.01)
*G02F 1/1335* (2006.01)

(52) U.S. Cl. .................... 349/143; 349/106; 349/139
(58) Field of Classification Search .............. 349/106, 349/139, 141, 143
See application file for complete search history.

(56) References Cited

U.S. PATENT DOCUMENTS

| 6,583,840 B1 * | 6/2003 | Inoue et al. ................ 349/141 |
| 2006/0203169 A1 | 9/2006 | Ozawa et al. |
| 2007/0126968 A1 | 6/2007 | Uochi |

FOREIGN PATENT DOCUMENTS

| JP | A-2001-056489 | 2/2001 |
| JP | A-2003-140188 | 5/2003 |
| JP | A-2006-243036 | 9/2006 |
| JP | A-2007-140492 | 6/2007 |

* cited by examiner

*Primary Examiner*—Frank G Font
*Assistant Examiner*—Michael P Mooney
(74) *Attorney, Agent, or Firm*—Oliff & Berridge, PLC (57) ABSTRACT

A liquid crystal display includes: a pair of substrates; a liquid crystal layer sandwiched between the pair of substrates; an insulating layer provided for a first substrate of the pair of substrates; an upper electrode provided for the first substrate; and a lower electrode provided for the first substrate. The upper electrode is formed on the surface of the insulating layer adjacent to the liquid crystal layer. The upper electrode includes a plurality of branches each having a slit therebetween. The insulating layer has irregularities.

10 Claims, 7 Drawing Sheets

LIQUID CRYSTAL DISPLAY

BACKGROUND

1. Technical Field

The present invention relates to liquid crystal displays and, in particular, to a liquid crystal display in which pixel electrodes and a common electrode are provided for the same substrate and at least one of the electrodes has slits.

2. Related Art

In fringe field switching (FFS) mode liquid crystal displays, both of pixel electrodes and a common electrode that control the orientation of the liquid crystal are provided for the same substrate. The two electrodes are stacked with an insulating layer therebetween. The upper electrode of these electrodes, that is, the electrode adjacent to the liquid crystal layer has slits. The upper electrode is rubbed substantially in parallel to the length (the long side) of the slits. When the voltage between the electrodes is an OFF-state voltage, the liquid crystal molecules are oriented substantially in parallel to the length of the slits. When a voltage higher than the OFF-state voltage is applied to between the electrodes, an electric field is generated in the direction perpendicular to the long side of the slits, so that the liquid crystal molecules are rotated along the direction of the electric field in the plane substantially parallel to the substrate. The amount of light to be transmitted can be controlled by controlling the rotation angle of the liquid crystal molecules. The pixel electrodes and the common electrode are stacked with an insulating layer therebetween to form a hold capacitor. An example is disclosed in JP-A-2003-140188.

If strong extraneous light enters an FFS mode liquid crystal display, a rainbow-colored stripe pattern sometimes appears. This may be caused by the fact that the extraneous light is reflected in the liquid crystal display and the reflected light interferes with one another because of the regular arrangement of the slits. The stripe pattern can be generated not only when no image is displayed but also when an image is displayed.

SUMMARY

An advantage of some aspects of the invention is that a liquid crystal display in which interference of light due to slits can be prevented.

A liquid crystal display according to an aspect of the invention includes: a pair of substrates; a liquid crystal layer sandwiched between the pair of substrates; an insulating layer provided for a first substrate of the pair of substrates; an upper electrode provided for the first substrate; and a lower electrode provided for the first substrate. the upper electrode is formed on the surface of the insulating layer adjacent to the liquid crystal layer. The upper electrode includes a plurality of branches each having a slit therebetween. The insulating layer has irregularities. This structure can prevent light interference due to the slits.

It is preferable that the apexes of the irregularities be arranged irregularly. This structure can further prevent the light interference.

It is preferable that $(L+S) \times 0.1 \leq D \leq L+S$ be satisfied, where L (in μm) is the width of the branch, S (in μm) is the width of the slit, and D (in μm) is the distance between adjacent apexes of the irregularities. This structure can further prevent the light interference.

It is preferable that one or more of at least one of the apexes and the bottoms of the irregularities be provided for each branch. This structure can further prevent the light interference.

It is preferable that the upper electrode and the lower electrode be formed of a light-transmissive electrically conductive material and that the irregularities be disposed in a transmissive display region. This structure can prevent the light interference and allows light-transmissive display in which the open area ratio is improved.

It is preferable that the upper electrode be disposed on the surface of the insulating layer adjacent to the liquid crystal layer, that the lower electrode be disposed on the surface of the insulating layer remote from the liquid crystal layer, that a second insulating layer be formed on the surface of the lower electrode remote from the liquid crystal layer, and that the second insulating layer have irregularities. This structure can easily further prevent the light interference. For example, the insulating layer can be made of resin such as acryl, so that irregularities can easily be formed. The upper electrode, the lower electrode, and the insulating layer can be formed into the same irregular shape, which facilitates controlling the electric field generated between the upper electrode and the lower electrode and controlling the capacitor formed by the upper electrode, the lower electrode, and the insulating layer.

It is preferable that the liquid crystal display further include: a color filter formed on the second substrate of the pair of substrate; and a topcoat layer formed on the color filter and that the topcoat layer have irregularities. This structure can further prevent the light interference.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described hereinbelow with reference to the drawings.

Figure 1:
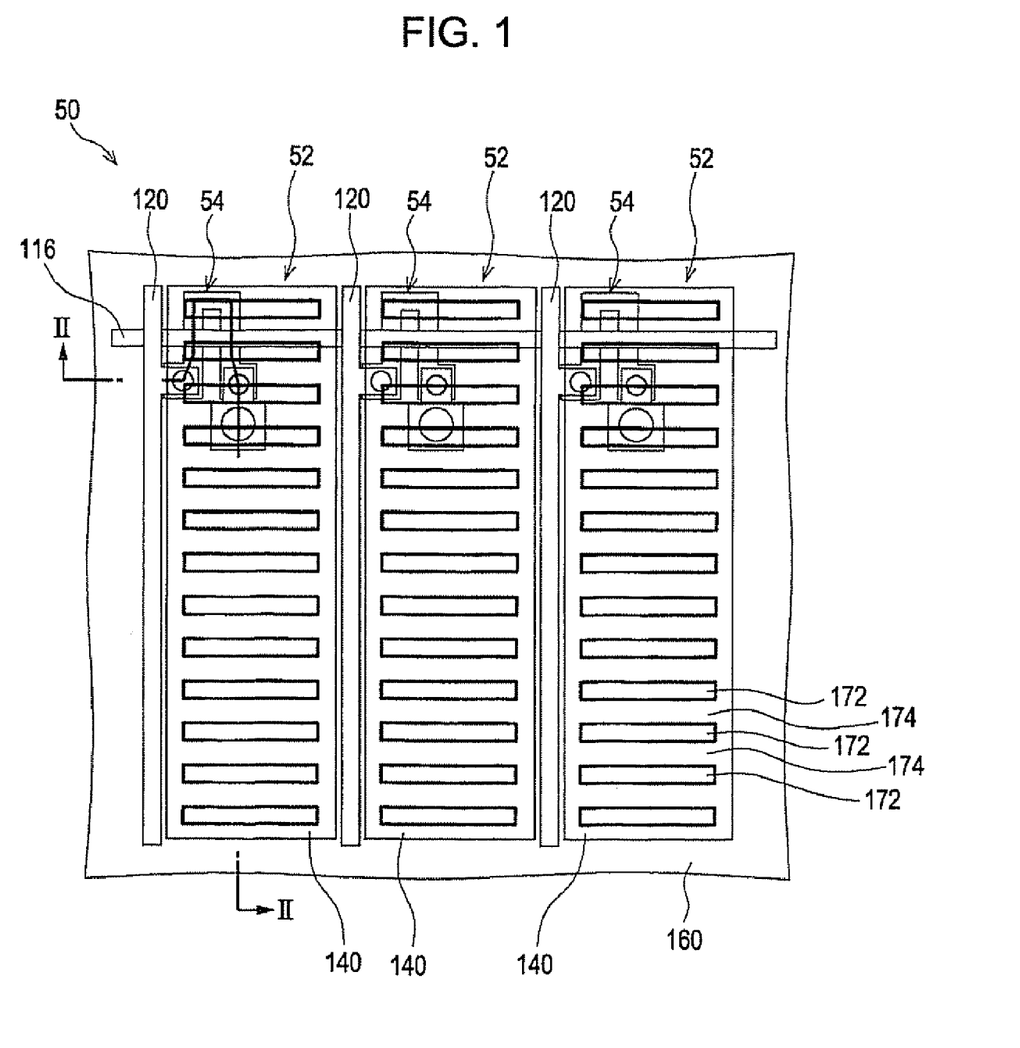
FIG. 1 is a plan view of a liquid crystal display according to an embodiment of the invention.
Figure 2:
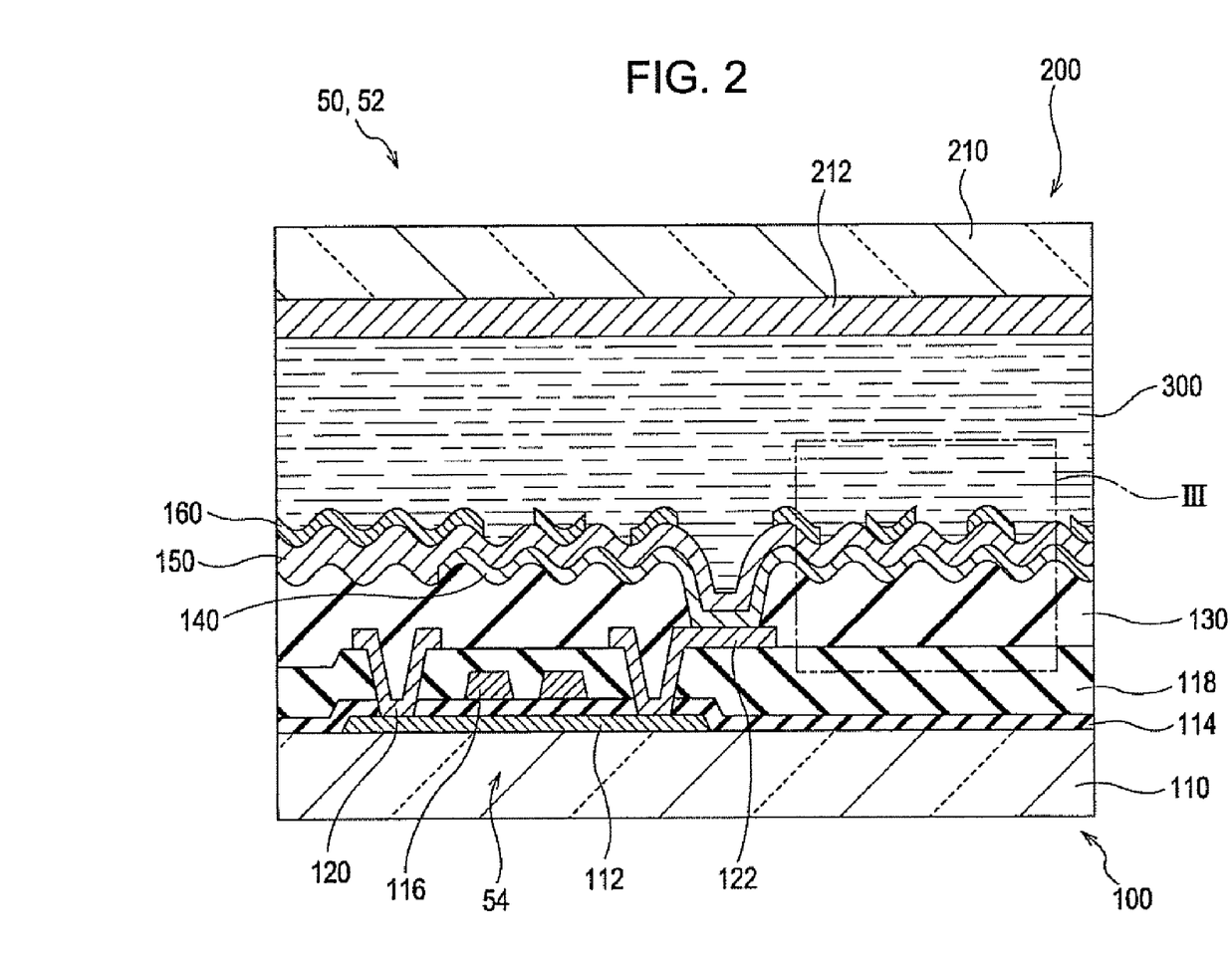
FIG. 2 is a cross sectional view taken along line II-II in FIG. 1.
Figure 3:
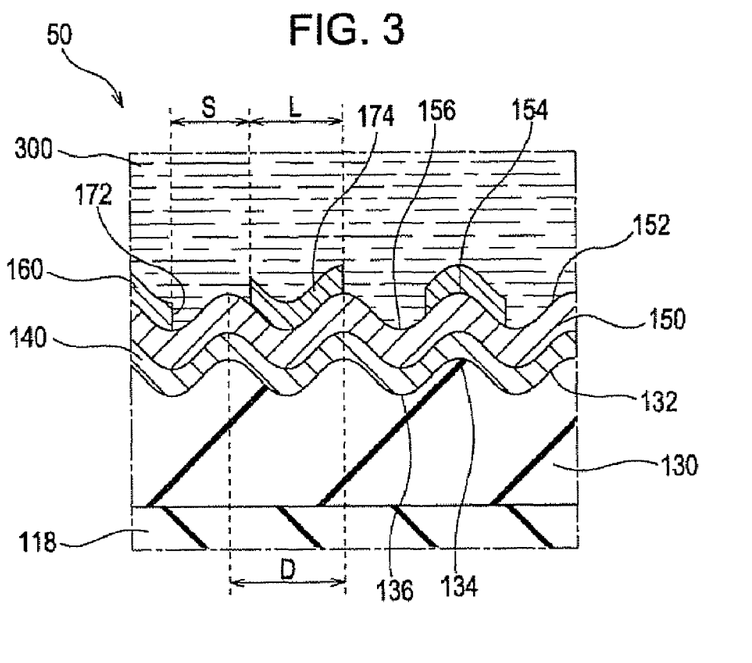
FIG. 3 is an enlarged view of a portion III encircled with alternate long and short dashed lines in FIG. 2.

FIG. 1 shows a plan view (layout) of a liquid crystal display 50 according to an embodiment of the invention. FIG. 2 shows a cross section taken along line II-II of FIG. 1. FIG. 3 shows an enlarged view of a portion III encircled with alternate long and short dashed lines in FIG. 2. In FIG. 1, part of the components shown in FIG. 2 is omitted.

FIG. 1 illustrates three pixels 52 arranged in a row direction (the lateral direction in the drawing) in the display region. Although FIG. 1 shows a matrix array, the pixels 52 may be arranged in delta form.

The three pixels 52 shown in FIG. 1 are composed of a pixel 52 representing red (R), a pixel 52 representing green (G), and a pixel 52 representing blue (B). These three pixels 52 constitute one unit for color representation. One unit for color representation is herein sometimes referred to as "a pixel", in which case the pixel 52 is referred to as "a subpixel". The color and the number of subpixels that constitute one unit for color representation are not limited to the above example.

As shown in FIG. 2, the liquid crystal display 50 includes a pair of opposed substrates 110 and 210 and a liquid crystal layer 300 sandwiched between the pair of substrates 110 and 210. If the liquid crystal display 50 is of a transmissive or semitransmissive type, the substrates 110 and 210 may be made of a light-transmissive glass substrate or the like. If the liquid crystal display 50 is of a reflecting type, one of the substrates 110 and 210 may not have translucency.

The substrates 110 and 210 have the following components to construct a device substrate 100 and a counter substrate 200, respectively. Accordingly, it can be said that the liquid crystal layer 300 is sandwiched between the device substrate 100 and the counter substrate 200.

The device substrate 100 includes, in addition to the substrate 110, pixel electrodes 140, an insulating layer 150, and a common electrode 160 on the surface of the substrate 110 adjacent to the liquid crystal layer 300. Outside the device substrate 100 is provided a backlight serving as a light source (not shown).

The pixel electrodes 140 and the common electrode 160 are stacked with the insulating layer 150 therebetween. The pixel electrode 140 is a lower electrode and the common electrode 160 is an upper electrode. The pixel electrodes 140 and the common electrode 160 can be made of a light-transmissive electrically conductive material such as indium tin oxide (ITO) so as to allow the light from the backlight to pass through. The insulating layer 150 can be made of, for example, silicone nitride. For example, the pixel electrode 140 is 100 nm in thickness and the common electrode 160 is 50 nm. An electrode disposed close to the liquid crystal layer 300 is made thin. The insulating layer 150 is 200 nm in thickness, for example.

The pixel electrode 140 is provided for each of the pixels 52. FIG. 1 shows an example in which the pixel electrode 140 is a rectangle that is long in the column direction (vertically in the drawing).

The common electrode 160 is provided across all the pixels 52. As an alternative, the common electrode 160 may be divided for each pixel 52 and the multiple common electrodes 160 may be connected together by wiring. As a further alternative, all the pixels 52 may be divided into groups, into which the common electrode 160 may be divided.

In the above structure, both of the pixel electrodes 140 and the common electrode 160 are provided for the substrate 110, and are stacked with the insulating layer 150 therebetween. That is, the liquid crystal display 50 is the FFS mode liquid crystal display.

The pixels 52 of the FFS mode liquid crystal display may have a boundary between adjacent pixel electrodes 140. The region (or range) of the pixel electrodes 140 can be disposed in correspondence with the region of the pixels 52. Furthermore, the open areas of a light-shielding film, to be described later, provided to the counter substrate 200 can be disposed in correspondence with the region of the pixels 52.

The liquid crystal display 50 has a structure in which the common electrode 160 is disposed close to the liquid crystal layer 300, and the portion of the common electrode 160 corresponding to each pixel 52 has a plurality of slits (or grooves) 172, in other words, a group of slits 172. These slits 172 form a line-and-space pattern on the common electrode 160. Here the slits 172 correspond to spaces, while the electrodes corresponding to lines are referred to as branches 174. In this case, multiple branches 174 are arrayed in each pixel 52, with the slits 172 therebetween.

The plurality of slits 172 of the liquid crystal display 50 each extend in a row direction and are arrayed in a column direction. Here the slits 172 are arrayed regularly in a column direction to constitute a regular arrangement of the slits 172 and the branches 174 on the common electrode 160. In this example, all the slits 172 and all the branches 174 have the same width, respectively. The width of the slits 172 is, for example, from 4.0 to 8.0 μm, and the width of the branches 174 is, for example, from 2.0 to 5.0 μm. The number of the slits 172 is not limited to the example illustrated. For simplification, the slits 172 in FIG. 1 are indicated by thick lines and the number thereof is differentiated among the drawings.

The electrodes 140 and 160 and the insulating layer 150 will be described later in more detail.

In the FFS mode, the rotation of the liquid crystal molecules in the liquid crystal layer 300 in the plane substantially parallel to the substrate 110 is controlled by controlling the electric field that is formed between the electrodes 140 and 160 through the slits 172. The amount of light to be transmitted is controlled by controlling the rotation angle of the liquid crystal molecules. In the FFS mode, the pixel electrodes 140 and the common electrode 160 are opposed not only at the slits 172 but also at the branches 174. Thus, the electrodes 140 and 160 constitute a hold capacitor through the insulating layer 150.

The device substrate 100 further includes pixel selection lines 116, display signal lines 120, and pixel transistors 54 on the surface of the substrate 110 adjacent to the liquid crystal layer 300. As will be described later, the pixel selection lines 116 are also referred to as gate lines or scanning lines, and the display signal lines 120 are also referred to as drain lines or data lines.

The liquid crystal display 50 is provided with a plurality of pixel selection lines 116, only one of which is shown in FIG. 1. In this example, the pixel selection lines 116 extend in a row direction and arrayed in a column direction. The liquid crystal display 50 is provided with a plurality of display signal lines 120, only three of which are shown in FIG. 1. In this example, the display signal lines 120 extend in a column direction and arrayed in a row direction. In this case, the display signal lines 120 and the pixel selection lines 116 intersect one another. The display signal lines 120 extend between adjacent pixel electrodes 140 in plan view.

The lines 116 and 120 can be made of metal such as molybdenum, aluminum, or titanium. Although FIG. 1 illustrates straight lines 116 and 120, one or both of the lines 116 and 120 may locally have a projecting portion or a meandering portion and extend generally in the above-described directions.

As shown in FIG. 1, the pixel transistors 54 are disposed in the vicinity of the intersections of the pixel selection lines 116 and the display signal lines 120. The pixel transistors 54 are each provided in each pixel 52.

The semiconductor layer 112 of the pixel transistor 54 may be made of, for example, polysilicon. In the example of FIG. 2, the semiconductor layer 112 is disposed on the substrate 110. The semiconductor layer 112 constitutes the active region (or the channel region), the source region, and the drain region of each pixel transistor 54. A gate insulating film 114 of the pixel transistor 54 is disposed on the semiconductor layer 112. The gate insulating film 114 may be made of, for example, silicon oxide or silicon nitride.

The pixel selection line 116 passes on the gate insulating film 114. Each pixel selection line 116 extends on the gate insulating film 114 through the pixels 52 arrayed in the row direction. In this case, the pixel transistors 54 arrayed in the row direction share one pixel selection line 116.

The pixel selection line 116 constitutes the gate electrode of the pixel transistor 54 at the portion opposed to the semiconductor layer 112, with the gate insulating film 114 therebetween. Accordingly, the pixel selection line 116 can also be referred to as a gate line 116. In the example of FIG. 1, the semiconductor layer 112 has substantially a U-shape (in FIG. 1, the substantially U-shape is flipped from top to bottom). The pixel selection line 116 extends across the two arms of the substantially U-shape. With this structure, the source region and the drain region of the semiconductor layer 112 are located on the same side with respect to the pixel selection line 116. Therefore, the pixel transistor 54 has a structure in which the pixel selection line 116 intersects the semiconductor layer 112 twice between the source region and the drain region, in other words, two gate electrodes are provided between the source region and the drain region.

The drain region of the semiconductor layer 112 is connected to the display signal line 120. Each display signal line 120 is connected to the plurality of pixel transistors 54 arrayed in the column direction. The pixel transistors 54 arrayed in the column direction share one display signal line 120. The source region of the semiconductor layer 112 is connected to the pixel electrode 140 of each pixel 52 with a relay electrode 122 of the pixel transistor 54 therebetween. The pixel electrode 140 can be connected to the source region without using the relay electrode 122. The relay electrode 122 may also be referred to as a source electrode 122 because it is connected to the source region. The display signal line 120 may also be referred to as a drain line 120 because it is connected to the drain region, as described above. The drain and the source may be opposite to the above.

With the above structure, the pixel electrode 140 is given a potential according to the display data for the pixel 52 through the display signal line 120 via the pixel transistor 54. Accordingly, the display signal line 120 may also be referred to as a data line 120. The pixel 52 to be impressed with potential is selected by application of ON potential of the pixel transistor 54 to the pixel selection line 116 connecting to the pixel 52. The pixel selection lines 116 are selected in sequence, for example. In this case, the pixel selection line 116 is also referred to as a scanning line 116. Another switching device other than the pixel transistor 54 may be used. Application of potential to the common electrode 160 may be made, for example, in the peripheral region outside the display region.

The device substrate 100 further includes an interlayer insulating film 118, an insulating layer 130, and an alignment film (not shown) on the surface of the substrate 110 adjacent to the liquid crystal layer 300.

The interlayer insulating film 118 is disposed on the gate insulating film 114 and covers the pixel selection line 116. The interlayer insulating film 118 may be made of, for example, silicon oxide or silicon nitride. Contact holes pass through the interlayer insulating film 118 and the gate insulating film 114 into the drain region and the source region of the semiconductor layer 112, respectively. The display signal line 120 is disposed on the interlayer insulating film 118. The display signal line 120 is connected to the drain region via the contact hole. The relay electrode 122 is disposed on the interlayer insulating film 118. The relay electrode 122 is connected to the source region via the contact hole.

The insulating layer 130 is disposed on the interlayer insulating film 118 and covers the display signal line 120 and the relay electrode 122. The insulating layer 130 may be made of resin such as acryl, with a thickness of 2 μm, for example. A contact hole passes through the insulating layer 130 into the relay electrode 122. The pixel electrode 140 is disposed on the insulating layer 130. The relay electrode 122 and the pixel electrode 140 are connected via the contact hole in each pixel 52. The insulating layer 130 will be described later in more detail.

An alignment film is disposed on the common electrode 160. The alignment film is rubbed substantially in parallel to the extending direction (in other words, along the length) of the slits 172, for example, at about 5 to 10 degrees with respect to the extending direction.

The liquid crystal display 50 further includes a polarizer (not shown) on the surface of the substrate 110 remote from the liquid crystal layer 300. The polarizer may be included in the device substrate 100.

The counter substrate 200 further includes, in addition to the substrate 210, a light shielding layer (not shown), a color filter 212, and an alignment film (not shown) on the surface of the substrate 210 adjacent to the liquid crystal layer 300.

The light shielding film may be made of resin, for example, and has an open area in each pixel 52. The open area has the color filter 212 in a color corresponding to the color to be represented by the pixel 52. The open areas of the light shielding film are opposed to the pixel electrodes 140, so that the color filters 212 face the pixel electrodes 140. The light shielding film and the color filters 212 are disposed on the substrate 210, for example. The alignment film is disposed on the color filters 212 and rubbed in the direction substantially perpendicular to the rubbing direction of the alignment film on the device substrate 100. Between the color filters 212 and the alignment film may be provided a topcoat layer, for example, a resin layer. If the liquid crystal display 50 is for monochrome representation, the color filters 212 can be omitted.

The liquid crystal display 50 further includes a polarizer (not shown) on the surface of the substrate 210 remote from the liquid crystal layer 300. The polarizer may be included in the counter substrate 200.

Referring to FIGS. 2 and 3, the liquid crystal display 50 will be described further.

The insulating layer 130 has irregularities 132 on the side adjacent to the liquid crystal layer 300. The insulating layer 130 having the irregularities 132 can be formed as follows: First, liquid or paste photosensitive resin is applied onto the interlayer insulating film 118 by spin coating or the like. This photosensitive resin layer later constitutes the insulating layer 130. The upper surface of the photosensitive resin applied is exposed to light through a photomask and is then developed. Thus, the upper surface of the resin layer is processed into the irregularities 132. If the photosensitive resin is of a negative type, a photomask can be used which has a light shielding portion that blocks light at the portion corresponding to the depressions of the irregularities 132. In this case, the exposed portions are left after the development to form the protrusions of the irregularities 132. The shape of the irregularities 132 can be varied with the setting of forming conditions. For example, the shape of the irregularities can be controlled according to the mask pattern of the photomask. The insulating layer 130 having the irregularities 132 may be formed by another method.

The pixel electrode 140, the insulating layer 150, and the common electrode 160 are stacked on the irregularities 132 in this order. The pixel electrode 140, the insulating layer 150, and the common electrode 160 here have an irregular shape corresponding to the irregularities 132. This irregular shape can be formed by selecting the thickness, material, and method for forming the components 140, 150, and 160 so that the irregularities 132 are not smoothed.

The insulating layer 150 has irregularities 152 on the side adjacent to the liquid crystal layer 300. In the example of FIG. 3, the irregularities 152 have apexes 154 above the apexes 134 of the irregularities 132, and have bottoms 156 above the bottoms 136 of the irregularities 132. The common electrode 160 is disposed on the irregularities 152.

With this structure, even if extraneous light is reflected by the common electrode 160, the reflected light can be scattered. Accordingly, the interference of light reflected by the slits 172 can be reduced as compared with a structure in which the common electrode 160 is formed on a flat surface so that it becomes flat. This advantage can be offered also by a structure in which the insulating layer 150 has the irregularities 152 but the irregularities 132 of the insulating layer 130 are changed to a flat surface. However, with the above structure, the pixel electrodes 140, the common electrode 160, and the insulating layer 150 can be made in the same irregular shape, allowing the distance between the pixel electrodes 140 and the common electrode 160 to be made constant. This facilitates controlling the electric field generated between the pixel electrodes 140 and the common electrode 160 and also facilitates controlling the hold capacitor formed by the pixel electrodes 140, the common electrode 160, and the insulating layer 150. Moreover, the irregularities of the pixel electrodes 140, the common electrode 160, and the insulating layer 150 can easily be formed by forming the irregularities 132 of the insulating layer 130.

It is preferable that the irregularities 152 be configured such that one or more of at least one of the apexes 154 and the bottoms 156 is provided for each branch 174. This structure allows light to be scattered at the branches 174, thus further preventing the interference of light.

It is preferable that the difference in altitude between the apexes 154 and the bottoms 156 be less than, for example, 400 to 500 nm. This is because a large difference in altitude of the irregularities 152 may cause unevenness of the distribution and strength of the electric field formed between the electrodes 140 and 160, resulting in a decrease in display quality. Because of the same reason, it is preferable that all the apexes 154 have substantially the same height (in other words, be substantially in the same plane). This applies also to the bottoms 156.

It is preferable that Eq. 1 be satisfied:

$$(L+S) \times 0.1 \leq D \leq L+S \quad [\text{Eq. 1}]$$

where L (in µm) is the width of each branch 174, S (in µm) is the width of each slit 172, and D (in µm) is the distance between adjacent apexes 154. This structure prevents the shape of the surfaces of the branches 174 from becoming the same, that is, prevents the light reflected by the branches 174 from traveling in the same direction. This increases the scattering of the reflected light, thus further reducing the light interference. To further increase the light scattering and reduce the light interference, it is more preferable that Eq. 2 be satisfied:

$$(L+S) \times 0.3 \leq D \leq (L+S) \times 0.6 \quad [\text{Eq. 2}]$$

FIGS. 2 and 3 show an example in which the protrusions of the irregularities 152 have the same size for ease of explanation. In contrast, as shown in the plan view of FIG. 4, the irregularities 152 may have protrusions of different sizes.

Figure 4:
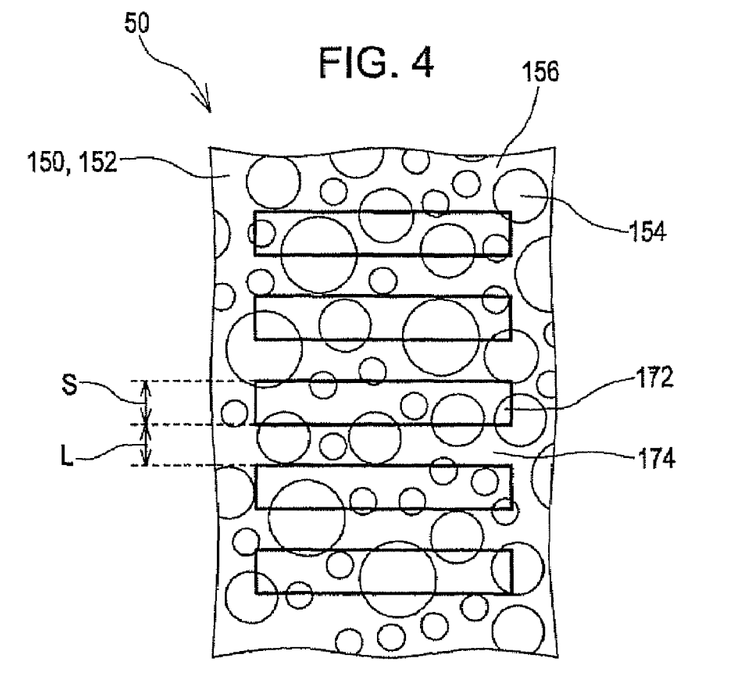
FIG. 4 is a plan view of a liquid crystal display according to another embodiment.

FIG. 4 schematically shows the circular boundaries between the protrusions and the depressions, the centers of which correspond to the apexes 154. That is, the protrusions are illustrated in substantially conical shape. The boundaries between the protrusions and the depressions of the irregularities 152 can be represented in contour that is the bisector of the difference in altitude between the apexes 154 and the bottoms 156. This applies also to the irregularities 132. FIG. 4 shows the outlines of the slits 172 with thick lines for ease of explanation.

While FIG. 4 illustrates projections of three sizes, projections may be of two, four, or more sizes. The size of the protrusions can be controlled according to the pattern of the photomask. The light scattering action of the irregularities 152 can be improved by forming various sizes or various kinds of protrusions. This structure further reduces the light interference.

FIGS. 2 and 3 illustrate a regular arrangement of the apexes 154 and the bottoms 156 for ease of explanation. In contrast, as shown in FIG. 4, the apexes 154 and the bottoms 156 may be arranged irregularly. This arrangement can increase the light scattering action to further reduce the light interference. While FIG. 4 illustrates projections of different sizes, as described above, the irregular arrangement of the apexes 154 and the bottoms 156 can be achieved even for projections of the same size.

The above structure is such that the common electrode 160 is disposed closer to the liquid crystal layer 300 than the pixel electrodes 140. Alternatively, the pixel electrodes 140 may be disposed close to the liquid crystal layer 300. The common electrode 160 is a lower electrode and the pixel electrode 140 is an upper electrode. A liquid crystal display 50B with this structure will be described hereinafter.

Figure 5:
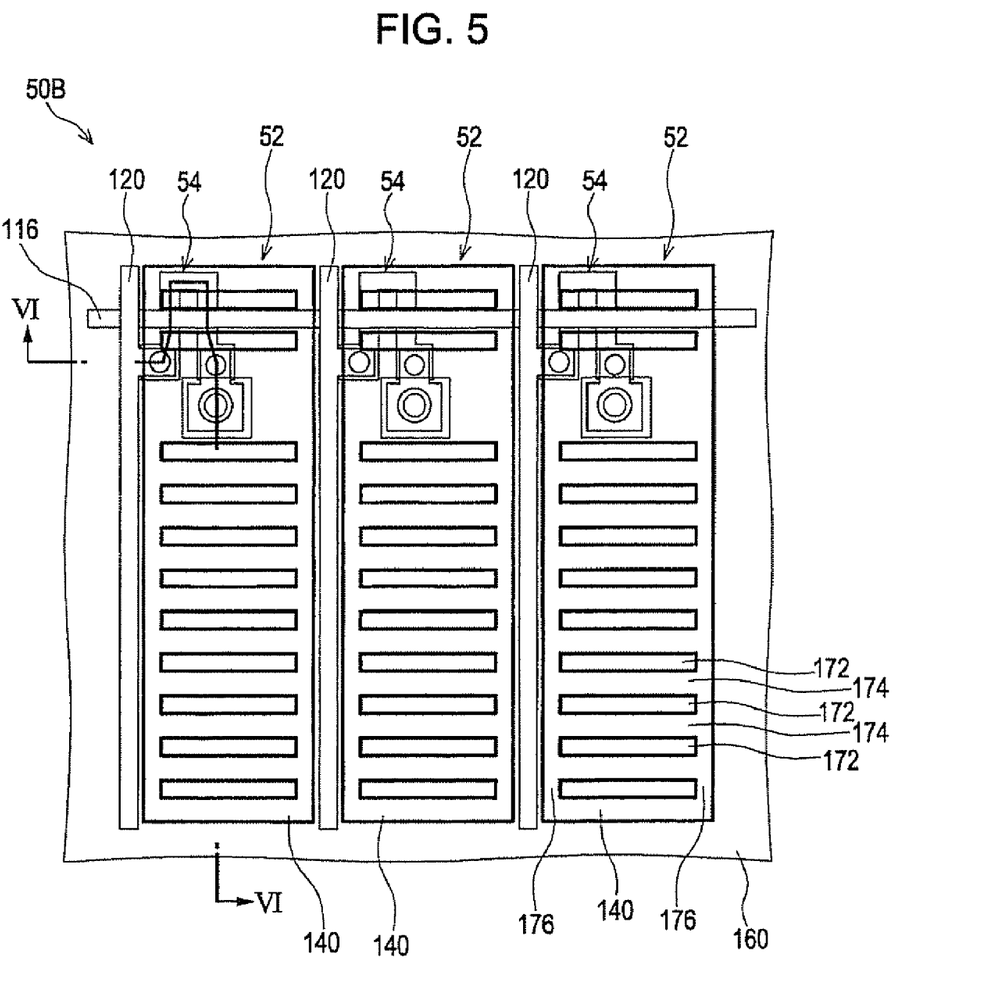
FIG. 5 is a plan view of a liquid crystal display according to another embodiment.
Figure 6:
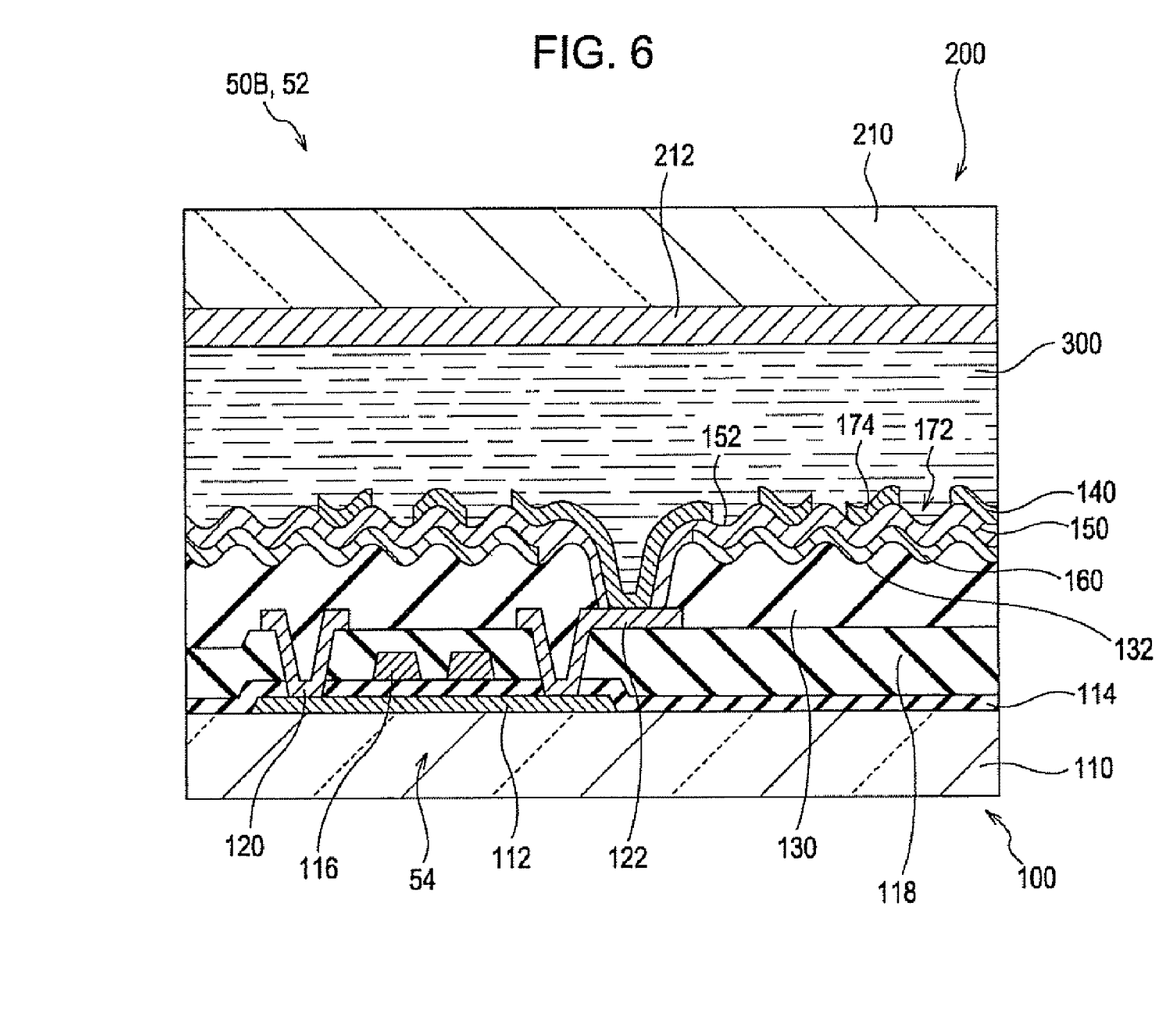
FIG. 6 is a cross sectional view taken along line VI-VI in FIG. 5.

FIG. 5 shows a plan view (layout) of the liquid crystal display 50B. FIG. 6 shows a cross section taken along line VI-VI of FIG. 5. In FIG. 5, the outlines of the pixel electrodes 140 and the slits 172 are indicated by the thick lines and part of the components shown in FIG. 6 is omitted.

The liquid crystal display 50B has a structure in which the common electrode 160 is disposed on the insulating layer 130, on which the pixel electrodes 140 are disposed, with the insulating layer 150 therebetween. An alignment film (not shown) covers the pixel electrodes 140. The pixel electrodes 140 disposed close to the liquid crystal layer 300 each have the slits 172 and the branches 174. The other components of the liquid crystal display 50B are the same as those of the liquid crystal display 50 (see FIGS. 1 to 4). Thus, the liquid crystal display SOB has the same advantages as those of the liquid crystal display 50.

The slits 172 of the liquid crystal display 50B do not reach the outer rim of the pixel electrode 140 (see FIG. 5) by way of example. Alternatively, the slits 172 may reach the outer rim of the pixel electrode 140. In other words, the pixel electrode 140 having the slits 172 may be shaped like a comb.

Figure 7:
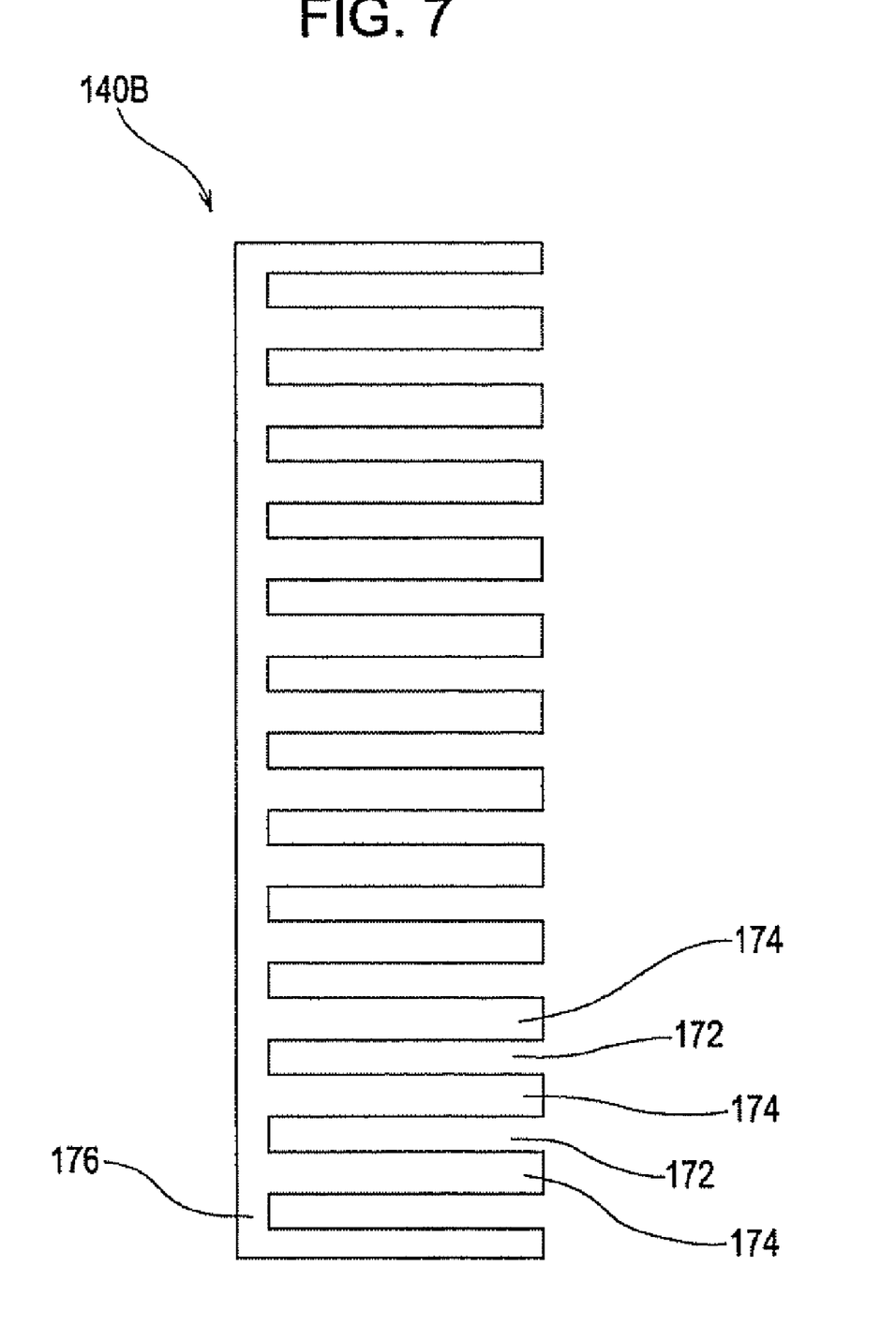
FIG. 7 is a plan view of a liquid crystal display according to another embodiment.

FIG. 7 shows a plan view of a comb-like pixel electrode 140B. The pixel electrode 140B also has multiple branches 174 between the slits 172 to form a line-and-space pattern. The pixel electrode 140B further has a trunk portion 176, with which the branches 174 are connected on one side. Although FIG. 7 illustrates an example in which the open end of the comb is located on the right of the drawing, the open end may be opposite to that of FIG. 7.

The common electrode 160 of the liquid crystal display 50 (see FIG. 2) is disposed on the liquid crystal layer 300 side.

Therefore, in the case of the common electrode 160 divided for each pixel 52, the common electrode 160 may be shaped like a comb.

The above structure in which one of the pixel electrodes 140 and the common electrode 160 is shaped like a comb also has the same advantages as those of the liquid crystal displays 50 and 50B. In an in-plane switching (IPS) mode, to be described next, both of the electrodes 140 and 160 are shaped like a comb. This structure also offers the same advantages as those of the liquid crystal displays 50 and 50B.

In the IPS mode, both of the pixel electrodes 140 and the common electrode 160 are shaped like a comb, which are engaged with each other in plan view. The teeth of the electrodes 140 and 160 at the engaged portion correspond to the branches 174. The teeth of the electrodes 140 and 160 are arranged with a space therebetween. The inter-electrode spaces correspond to the slits 172. In the IPS mode, the pixel electrodes 140 and the common electrode 160 are disposed on the irregularities 132 of the insulating layer 130, for example (see FIG. 3). In this case, if the irregularities 132 have the same structure as that of the irregularities 152 of the insulating layer 150, the same advantages as those of the liquid crystal displays 50 and 50B can be provided.

In the IPS mode, an electric field is generated between the electrodes 140 and 160 at the comb engaged portion, and the liquid crystal molecules in the liquid crystal layer 300 are rotated along the electric field in the plane substantially parallel to the substrate 110. The amount of light to be transmitted is controlled by controlling the rotation angle of the liquid crystal molecules.

While the above embodiments show the slits 172 extending in a row direction, the slits 172 may extend in a column direction. As a further alternative, the slits 172 may extend at an angle of inclination with respect to the row direction or the column direction.

While the above embodiments show the substantially conical protrusions of the irregularities 132 and 152, the shape of the protrusions is not limited to that; the apexes 134 and 154 of the protrusions may not be like a point but may be like a curve.

Figure 8:
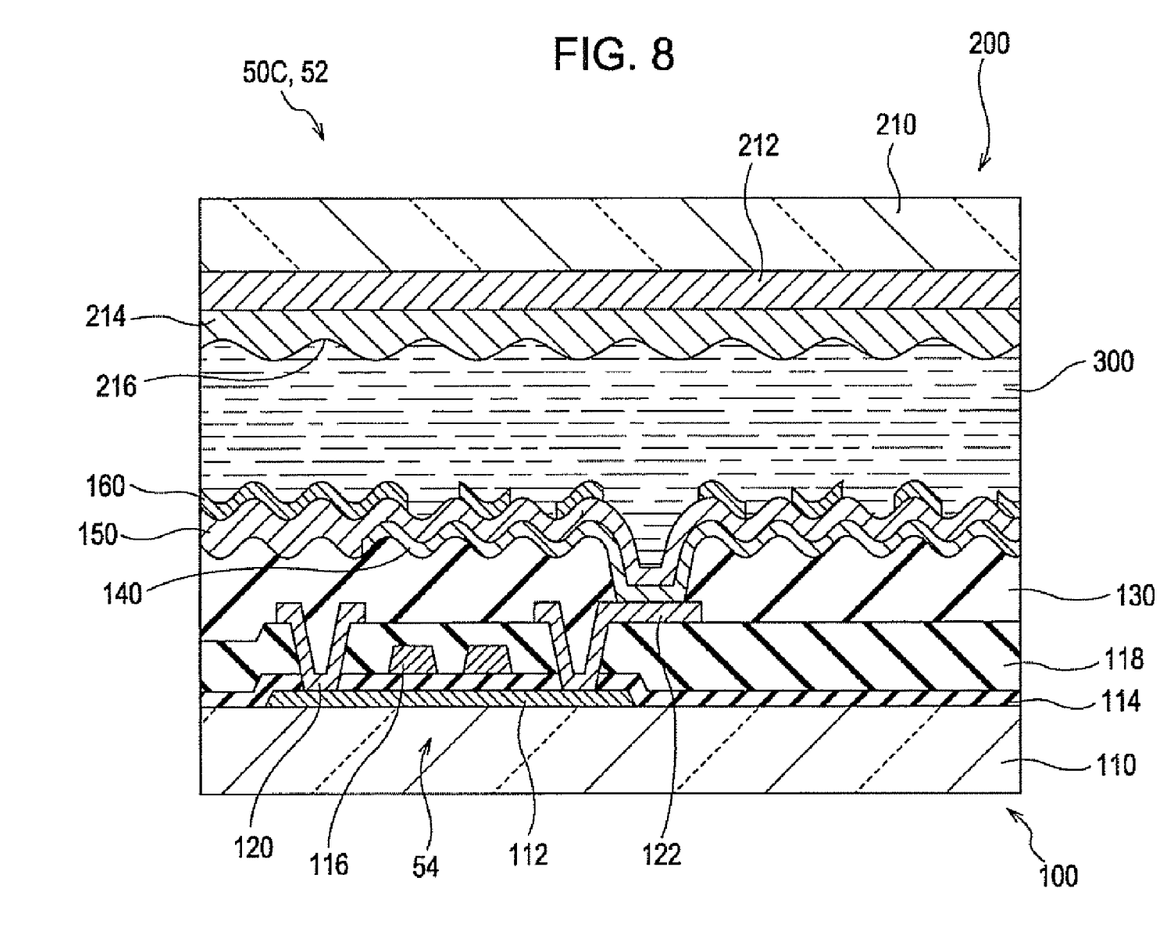
FIG. 8 is a plan view of a liquid crystal display according to another embodiment.

The counter substrate 200 may have the structure illustrated in the cross sectional view of FIG. 8. Specifically, a topcoat layer 214 is provided between the color filter 212 and an alignment film (not shown), and the surface of the topcoat layer 214 adjacent to the liquid crystal layer 300 may have irregularities 216. It is preferable that the shape, arrangement, and other conditions of the irregularities 216 be the same as those described for the irregularities of the device substrate. The irregularities of the device substrate and the irregularities of the counter substrate may be the same but may not necessarily be the same. The topcoat layer 214 having the irregularities 216 can be formed by the same method as that for the insulating layer 130. The liquid crystal display 50C shown in FIG. 8 uses the components of the liquid crystal display 50 as its other components (see FIG. 2).

With this structure, the extraneous light incident on the liquid crystal display 50C and the light reflected by the common electrode 160 having the slits 172 are scattered by the irregularities 216 of the topcoat layer 214. Therefore, the light interference can be prevented. A structure in which the topcoat layer 214 has the irregularities 216 and one or both of the irregularities 132 of the insulating layer 130 and the irregularities 152 of the insulating layer 150 is changed to a flat surface can also offer the above advantages.

Two or more of the above structures can be combined, which increases the light-interference prevention effect.

What is claimed is:

1. A liquid crystal display comprising:
   a pair of substrates;
   a liquid crystal layer sandwiched between the pair of substrates;
   an insulating layer provided for a first substrate of the pair of substrates;
   an upper electrode provided for the first substrate;
   a lower electrode provided for the first substrate; and
   a second insulating layer formed on the surface of the lower electrode remote from the liquid crystal layer,
   wherein the upper electrode is formed on the surface of the insulating layer adjacent to the liquid crystal layer,
   the upper electrode includes a plurality of branches each having a slit therebetween,
   the lower electrode is disposed on the surface of the insulating layer remote from the liquid crystal layer,
   the insulating layer and the second insulating layer each have irregularities.

2. The liquid crystal display according to claim 1, wherein the apexes of the irregularities are arranged irregularly.

3. The liquid crystal display according to claim 1, wherein $(L+S) \times 0.1 \leq D \leq L+S$ is satisfied,
   where L (in μm) is the width of the branch,
   S (in μm) is the width of the slit, and
   D (in μm) is the distance between adjacent apexes of the irregularities.

4. The liquid crystal display according to claim 1, wherein at least one of the apexes of the irregularities is provided for each branch.

5. The liquid crystal display according to claim 1, wherein at least one of the bottoms of the irregularities is provided for each branch.

6. The liquid crystal display according to claim 1, wherein the upper electrode and the lower electrode are formed of a light-transmissive electrically conductive material that allows the light from a light source to pass through to achieve transmissive-mode display.

7. The liquid crystal display according to claim 1, further comprising:
   a color filter formed on the second substrate of the pair of substrates; and
   a topcoat layer formed on the color filter,
   wherein the topcoat layer has irregularities.

8. The liquid crystal display according to claim 1,
   wherein the upper electrode is a common electrode, and the lower electrode is a pixel electrode.

9. The liquid crystal display according to claim 1,
   wherein the upper electrode is a pixel electrode, and the lower electrode is a common electrode.

10. The liquid crystal display according to claim 1,
    wherein at least one of the apexes of the irregularities is provided for each branch, and
    at least one of the bottoms of the irregularities is provided for each branch.

* * * * *